(No Model.)

C. A. CALVERT.
CANE MILL.

No. 553,607. Patented Jan. 28, 1896.

WITNESSES: Chas. F. Burkhardt, Henry L. Deck

INVENTOR. C. A. Calvert
By Wilhelm Bonner
ATTORNEYS.

ANDREW B. GRAHAM, PHOTO-LITHO. WASHINGTON, D.C.

UNITED STATES PATENT OFFICE.

CHARLES A. CALVERT, OF BUFFALO, NEW YORK, ASSIGNOR, BY MESNE ASSIGNMENTS, TO THE GEORGE L. SQUIER MANUFACTURING COMPANY, OF SAME PLACE.

CANE-MILL.

SPECIFICATION forming part of Letters Patent No. 553,607, dated January 28, 1896.

Application filed July 2, 1895. Serial No. 554,688. (No model.)

*To all whom it may concern:*

Be it known that I, CHARLES A. CALVERT, a citizen of the United States, residing in the city of Buffalo, county of Erie, and State of New York, have invented a new and useful Improvement in Cane-Mills, of which the following is a specification.

This invention relates to the metallic bottom plates of vertical cane-mills. These plates ordinarily have a marginal flange forming with the plate a pan or receiver which catches and discharges the juice expressed from the cane, and they are also formed with pockets or rims extending above the bottom plate and containing the boxes of the lower roller-journals. Such mills are also provided with a guide or scraper which is arranged between the two small or minor rollers and which has heretofore been journaled at its lower end in a bearing or opening formed in the bottom plate. Chips of bagasse are liable to lodge or accumulate in the space between the opposing peripheral portions of the rollers, and the scraper as heretofore arranged obstructs access to such chips, rendering it difficult to remove them.

My invention has for its objects to improve the construction of the bottom plate with a view of effecting a freer discharge of the juice, so as to prevent the same from overflowing the pan and to arrange the scraper in such a manner as to facilitate the removal of any chips that may collect in the juice-receiving space of the pan.

Figure 1:
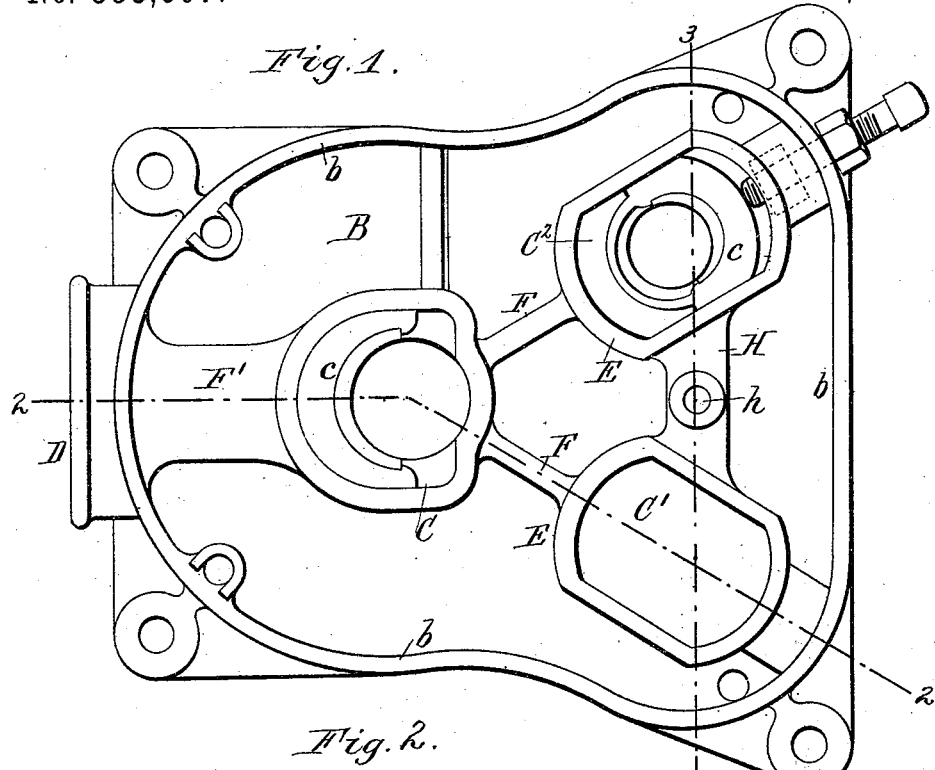
Figure 2:
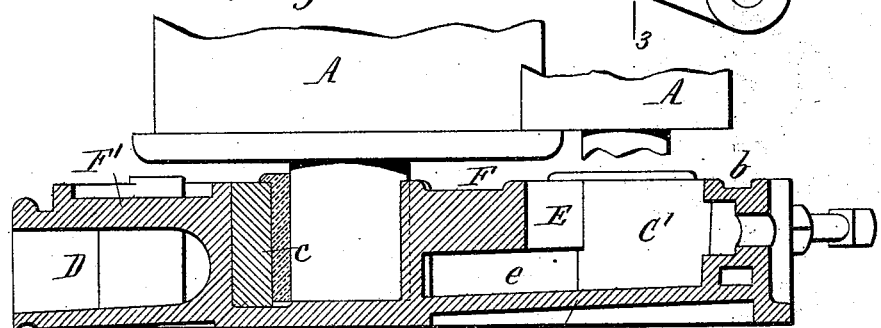
Figure 3:
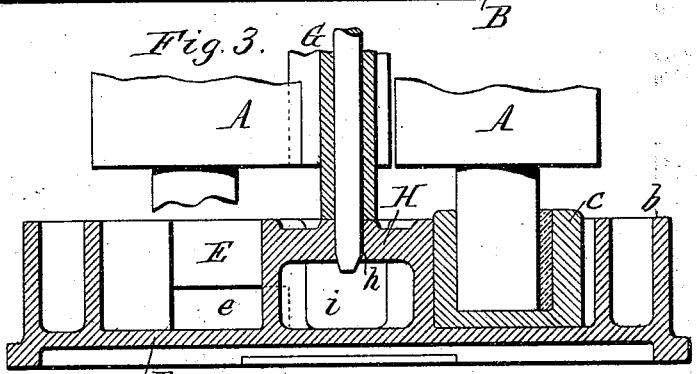

In the accompanying drawings, Figure 1 is a top plan view of the bottom plate with the journal-box removed from one of the pockets. Fig. 2 is a vertical longitudinal section thereof in line 2 2, Fig. 1. Fig. 3 is a transverse vertical section in line 3 3, Fig. 1.

Like letters of reference refer to like parts in the several figures.

A represents the rollers of the mill.

B is the horizontal plate forming the bottom of the pan, and $b$ the raised marginal flange or rim forming the wall of the pan.

C C' C² represent the pockets which receive, respectively, the lower journal-boxes $c$ of the large or main roller and the two smaller rollers. The bottoms of the pockets are preferably on a level with the bottom plate, and their upright walls extend upward sufficiently to form a long bearing for the journal-boxes.

The pockets of the small rollers converge toward the pocket of the large roller and are elongated in the well-known manner to afford the requisite adjustment of the small rollers.

D is the discharge spout or opening which is arranged in the wall of the pan, preferably behind the large roller and through which the expressed juice flows from the pan into a suitable receptacle. The wall of the pan is of such a height that an opening or spout of ample size may be provided for the discharge of the juice.

The pockets of the small rollers communicate with the surrounding pan by openings or passages formed in their inner walls at or near the bottom of the pan. If desired, the inner ends of the pockets may be left entirely open for this purpose; but they are preferably bridged by a transverse wall E, which connects the upper portions of the side walls of the pockets, so as to leave a passage $e$ between the bridge and the bottom of the pan. These passages allow the juice which enters the pockets to flow off into the pan, thus preventing flooding of the journal-boxes. The closed journal boxes or cups extend slightly above the pockets, to prevent any juice that may run into the pockets from mingling with the lubricating-oil in the boxes.

F represents reinforcing-webs or bridge-pieces which connect the inner walls or bridges E of the small roller-pockets with the large roller-pocket and whereby the pockets and the pan are stiffened. These bridge-pieces are raised a sufficient distance above the bottom of the pan to form an ample passage for the juice, as shown in Figs. 2 and 3. F' is a similar longitudinal bridge-piece connecting the main roller-pocket with the wall of the pan.

To facilitate the discharge of the juice the bottom of the pan is sloped toward the discharge-spout.

By arranging the bottoms of the pockets substantially on a level with the bottom of the pan and providing the pockets immediately above the bottom plate with outlet-openings, an unobstructed and unbroken course is provided for the juice from the pockets to the discharge-opening, which course is not liable to become clogged with bagasse-chips, thereby insuring a free discharge of the juice at all times and effectually preventing overflowing of the pan and flooding of the pockets.

G is a scraper or guide of any ordinary or suitable construction arranged between the small rollers. The shaft of this scraper is journaled at its lower end in a bearing or opening $h$ formed in a horizontal bridge piece or support H, which connects the pockets of the small rollers. This bridge-piece is arranged above the bottom of the pan, as shown in Fig. 3, so as to leave an unobstructed space $i$ underneath the bridge-piece through which the hand or an implement may be passed for removing any chips of bagasse which may collect in the central juice-receiving space of the pan. The bridge-piece, while serving as a raised support for the scraper, also forms a reinforcement between the pockets of the small rollers.

My improved bottom plate also dispenses with the discharge-opening near the center of the pan heretofore employed, thereby avoiding the inconvenience of clearing said opening, due to the difficulty of gaining access to the opening.

I claim as my invention—

1. In a cane mill, an imperforate bottom plate provided with a raised flange or rim forming a pan, and with journal pockets having their walls extended above the bottom of the pan and their bottoms on a level therewith, and provided in their inner walls with openings or passages arranged above the bottom of the pan, whereby the pockets communicate with the surrounding space of the pan, substantially as set forth.

2. In a cane mill, a bottom plate provided with a raised flange or rim forming a pan, and with journal pockets for the bearings of the small rollers extending above said bottom plate, the inner end of each of said pockets being bridged by a wall extending across the upper portion of the pocket and separated from the bottom plate by an intervening space or passage, whereby the pocket communicates with the pan, substantially as set forth.

3. In a cane mill, a bottom plate provided with a raised flange or rim forming a pan, and with journal pockets for the large and small crushing rollers extending above the bottom plate, the inner end of each of the small journal pockets being bridged by a wall extending across the upper portion of the pocket and separated from the bottom plate by an intervening space or passage, and webs or bridge pieces connecting the bridge walls of said pockets with the large journal pocket, substantially as set forth.

4. In a cane mill, the combination with the bottom plate and the crushing rollers, of a support arranged adjacent to said rollers and raised above the bottom plate, and a scraper having its lower end journaled on said support, whereby an unobstructed space is left below the scraper and between the adjacent rollers, substantially as set forth.

5. In a cane mill, the combination with the bottom plate having a raised rim or flange forming a pan, and a pair of opposing journal pockets extending above the bottom plate, of a horizontal bridge piece connecting said pockets, having a bearing for the lower journal of a scraper and raised above the bottom plate, whereby a space is left between the bridge piece and the bottom plate for the removal of chips, substantially as set forth.

Witness my hand this 20th day of June, 1895.

CHARLES A. CALVERT.

Witnesses:
JNO. J. BONNER,
KATHRYN ELMORE.